(12) United States Patent
Suh et al.

(10) Patent No.: US 9,000,157 B2
(45) Date of Patent: *Apr. 7, 2015

(54) METALLIC COMPOUND AND ORGANIC ELECTROLUMINESCENCE DEVICE COMPRISING THE SAME

(75) Inventors: Dong-Hack Suh, Seongnam (KR); Jin-Sik Choi, Seoul (KR); Jin-Soo Lim, Seoul (KR); Song-Ho Kim, Seoul (KR); Dae-Beom Kim, Seoul (KR)

(73) Assignees: Samsung Display Co., Ltd. (KR); Industry-University Cooperation Foundation Hanyang University (KR)

( * ) Notice: Subject to any disclaimer, the term of this patent is extended or adjusted under 35 U.S.C. 154(b) by 1009 days.

This patent is subject to a terminal disclaimer.

(21) Appl. No.: 12/913,274

(22) Filed: Oct. 27, 2010

(65) Prior Publication Data

US 2011/0184170 A1 Jul. 28, 2011

Related U.S. Application Data

(62) Division of application No. 11/913,196, filed as application No. PCT/KR2007/000108 on Jan. 8, 2007, now Pat. No. 7,858,783.

(30) Foreign Application Priority Data

Jan. 6, 2006 (KR) .................. 10-2006-0001801

(51) Int. Cl.
| | | |
|---|---|---|
| C07F 1/00 | (2006.01) | |
| C07F 3/00 | (2006.01) | |
| C07F 3/08 | (2006.01) | |
| C07F 5/00 | (2006.01) | |
| C07F 5/06 | (2006.01) | |
| C07F 7/00 | (2006.01) | |
| C07F 9/00 | (2006.01) | |
| C07F 11/00 | (2006.01) | |
| C07F 13/00 | (2006.01) | |
| C07F 15/00 | (2006.01) | |
| C07F 17/00 | (2006.01) | |
| H05B 33/14 | (2006.01) | |
| C09K 11/06 | (2006.01) | |

(52) U.S. Cl.
CPC ............... *H05B 33/14* (2013.01); *C09K 11/06* (2013.01); *C09K 2211/185* (2013.01)

(58) Field of Classification Search
None
See application file for complete search history.

(56) References Cited

U.S. PATENT DOCUMENTS

| 6,703,146 | B1 | 3/2004 | Sakaguchi et al. | |
| 7,858,783 | B2 * | 12/2010 | Suh et al. | 544/225 |
| 2005/0287391 | A1 | 12/2005 | Chang et al. | |

FOREIGN PATENT DOCUMENTS

| JP | 2003077675 | 3/2003 |
| JP | 2003264086 | 9/2003 |
| JP | 2003007471 | 10/2003 |

OTHER PUBLICATIONS

Lamansky, Sergey; Djurovich, Peter; Murphy, Drew; Abdel-Razzaq, Feras; Lee, Hae-Eun; Adachi, Chihaya; Burrows, Paul E.; Forrest, Stephen R.; and Thompson, Mark E.,"Highly Phosphorescent Bis-Cyclometalated Iridium Complexes: Synthesis, Photophysical Characterization, and Use in Organic Light Emitting Diodes"; J. Am. Chem. Soc. 2001, 123, pp. 4304-4312.

Lamansky, Sergey; Djurovich, Peter; Murphy, Drew; Abdel-Razzaq, Feras; Lee, Hae-Eun; Adachi, Chihaya; Burrows, Paul E.; Forrest, Stephen R.; and Thompson, Mark E., "Synthesis and Characterization of Phosphorescent Cyclometalated Iridium Complexes"; Inorg. Chem. 2001, 40, pp. 1704-1711.

Grushin, Vladimir V.; Herron, Norman; LeCloux, Daniel D.; Marshall, William J., Petrov, Viacheslav A.; "New, efficient electroluminescent materials based on organometallic Ir complexes," Chem. Commun., 2001, pp. 1494-1495.

PCT International Search Report dated Mar. 28, 2007; International Application No. PCT/KR2007/000108; International Filing Date Jan. 8, 2007. All references cited on the Search Report and not previously submitted are listed above.

PCT International Written Opinion dated Mar. 28, 2007; International Application No. PCT/KR2007/000108; International Filing Date Jan. 8, 2007. All references cited on the Written Opinion and not previously submitted are listed above.

Yin et al.; Inorganica Chimica Acta (2007), 360(8), pp. 2797-2808.

* cited by examiner

*Primary Examiner* — Jeffrey H Murray
(74) *Attorney, Agent, or Firm* — Cantor Colburn LLP

(57) ABSTRACT

The present invention relates to an organic electroluminescence device containing a light emitting metallic compound of Chemical Formula 1.

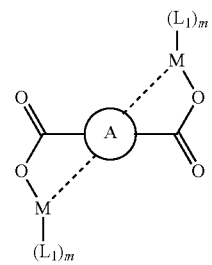

[Chemical Formula 1]

In the Chemical Formula 1, M is selected from Ir, Pt, Rh, Re, and Os, and m is 2, provided that m is 1 when M is Pt.

2 Claims, No Drawings

METALLIC COMPOUND AND ORGANIC ELECTROLUMINESCENCE DEVICE COMPRISING THE SAME

CROSS REFERENCE TO RELATED APPLICATIONS

This application is a divisional of U.S. patent application Ser. No. 11/913,196, filed on Oct. 31, 2007, now U.S. Pat. No. 7,858,783, which is a National Stage filing of International Patent Application No. PCT/KR2007/000108, filed Jan. 8, 2007, and which claims priority to Korean Patent Application No. 10-2006-0001801, filed Jan. 6, 2006, and all the benefits accruing therefrom under 35 U.S.C. 119, the contents of which are in their entirety herein incorporated by reference.

TECHNICAL FIELD

The present invention relates to a metallic compound and an organic electroluminescence device including the same, and more particularly, to a metallic compound that is applicable as a highly efficient phosphor host material and an organic electroluminescence device including the same.

BACKGROUND OF ART

An electroluminescence device (EL device) is a self-light emitting display device having such merits as a wide viewing angle and excellent contrast as well as a quick response time.

EL devices are classified into an inorganic EL device and an organic EL device in accordance with a material used for a light emitting layer. The organic EL device has merits of improved luminance, driving voltage, response speed, and multi-colorfying property compared to an inorganic EL device.

An organic EL device is generally composed of an anode on a substrate, a hole transport layer on the anode, and a light emitting layer, an electron transport layer (ETL), and a cathode sequentially positioned thereon. The hole transport layer, light emitting layer, and electron transport layer (ETL) are organic films that are composed of organic compounds.

The organic EL device having the above structure is operated as follows.

When a voltage is applied to a space between the anode and the cathode, the holes are injected from the anode to the light emitting layer through the hole transport layer. Meanwhile, when the electrons are injected from the cathode into the light emitting layer through the electron transport layer (ETL), carriers are recombined in the region of the light emitting layer to thereby produce excitons. The state of the excitons is changed from an exited state to a base state, and the change in the state of the excitons makes the molecules of the light emitting layer emit light to thereby form an image.

Materials for forming a light emitting layer are divided into fluorescent materials using singlet excitons and phosphorescent materials using triplet excitons according to the light emitting mechanism. Phosphorescent materials generally include organic/inorganic compound structures including transition element atoms. The transition element atoms change triplet excitons, which used to be impossible to transition, into excitons that are possible to transition, causing them to emit phosphorescent light. Since the phosphorescent materials can use triplet excitons having a generation probability of 75%, higher luminous efficiency can be achieved than with fluorescent materials using singlet excitons having a generation probability of 25%.

Among light emitting materials using the triplet excitons are phosphorescent materials including iridium and platinum compounds (Sergey Lamansky et al. Inorg. Chem., 40, 1704-1711, 2001, and Sergey Lamansky et al., J. Am. Chem. Soc., 123, 4304-4312, 2001). For blue light emitting materials, Ir compounds based on $(4,6-F2ppy)_2$Irpic or a fluorinated ppy ligand structure have been developed (Vladimir V. Grushin et al., Chem. Commun., 1494-1495, 2001). The $(4,6-F2ppy)_2$Irpic, however, has shortcomings that it emits light in a sky blue region and its large shoulder peaks increase a y value in color purity coordinates. Researchers are studying red and green light emitting materials, but there still remains great demand to develop highly efficient phosphorescent materials having a long lifespan.

DETAILED DESCRIPTION OF THE INVENTION

Technical Problem

In order to solve the problems, the object of the present invention is to provide a phosphor dimeric metallic compound having a new co-ligand structure and an organic electroluminescence device having improved luminous efficiency and color purity.

Technical Solution

The present invention relates to a light-emitting transition metal compound represented by the following Chemical Formula 1 and an organic electroluminescence device including the same:

[Chemical Formula 1]

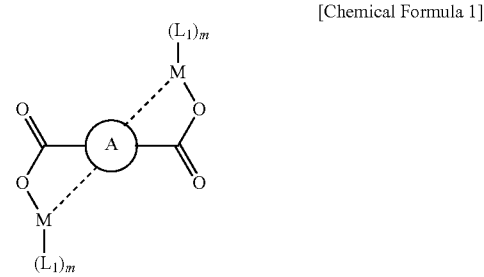

Wherein, M is selected from Ir, Pt, Rh, Re, Os, or the like, m is 2, provided that m is 1 when M is Pt,

of the Chemical Formula 1 is represented by any one of the following Chemical Formulae 2:

[Chemical Formulae 2]

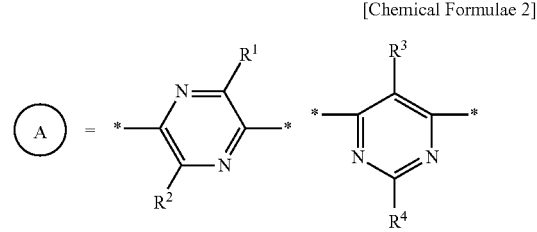

-continued

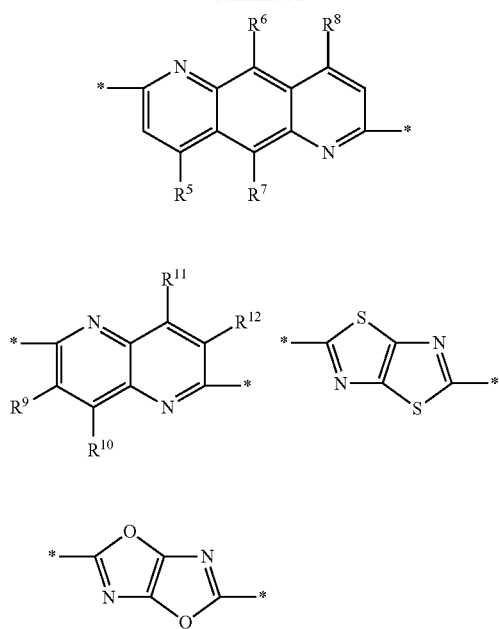

Wherein, a portion denoted as * in the above Chemical Formulae 2 has a carboxyl substituent, and transition metal M forms a complex compound by a covalent bond with the carboxyl group and a coordination bond with an adjacent N or P atom, and $R^1$-$R^{12}$ are hydrogen, a C1 to C20 alkyl excluding an aromatic cyclic substituent, a cycloalkyl, a halogen, a linear or branched substituent including at least one halogen, or a linear or branched substituent including at least one heteroatom, or form a cycle, and may be the same or different. In the above formula 1, $L^1$ is represented by the following formula 3:

[Chemical Formula 3]

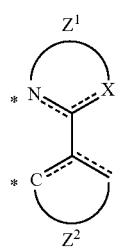

$L^1$ in the above formula 3, is a independent ligand having a covalent bond site with a carbon denoted as * and a coordination bond with nitrogen and forming a complex compound with the transition metal M, and X is a hetero atom of nitrogen, oxygen, sulfur, phosphorus, and so on, and $Z^1$ and $Z^2$ are atoms for forming a C4 to C7 aromatic hydrocarbon ring or aromatic heterocyclic ring.

In the present invention, a hetero aromatic dicarboxylic acid derivative is introduced for a co-ligand.

The examples of the co-ligand are represented by the following Chemical Formula 4:

[Chemical Formula 4]

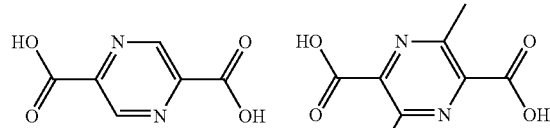

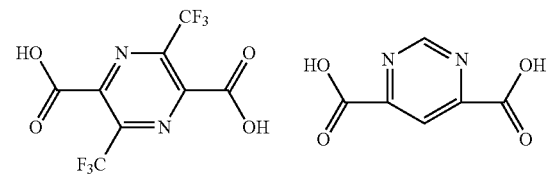

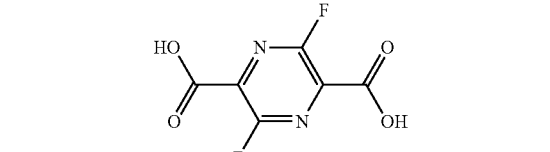

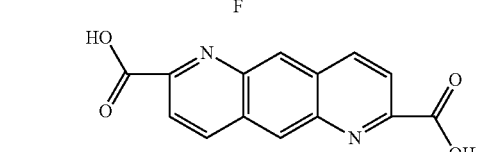

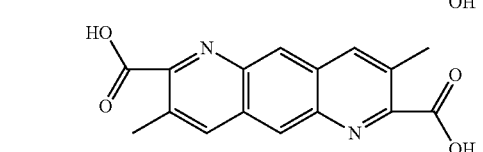

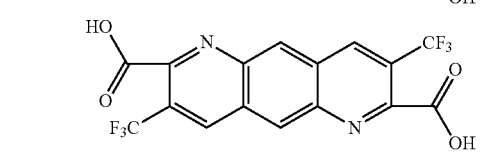

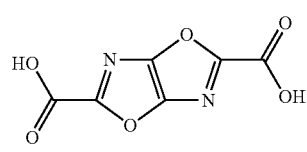

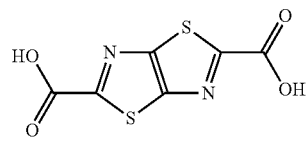

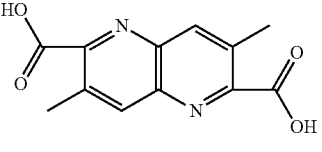

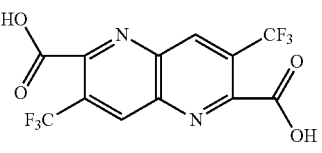

-continued

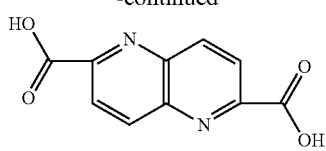

A functional group having a large steric hindrance such as an alkyl, an aryl, a halogen, a silyl, and so on can be independently introduced to each $L^1$ ligand. Several nm of light-emission and light wavelength can be easily controlled in accordance with the positions of the substituents and the properties of electron donors. The $L^1$ ligand of the present invention is represented by any one of the following Chemical Formulae 5:

[Chemical Formulae 5]

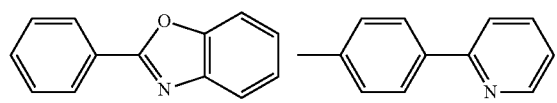

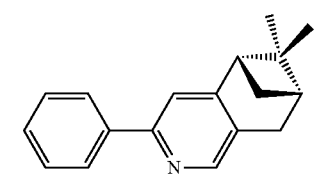

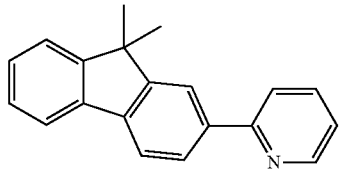

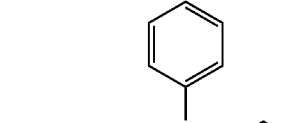

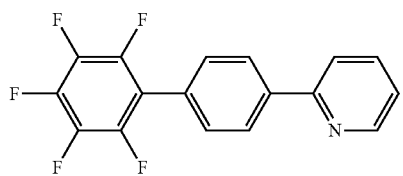

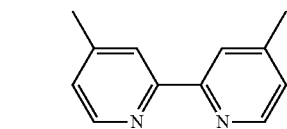

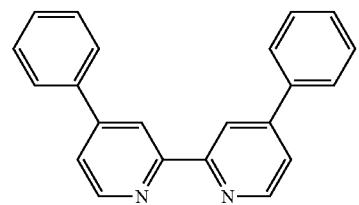

-continued

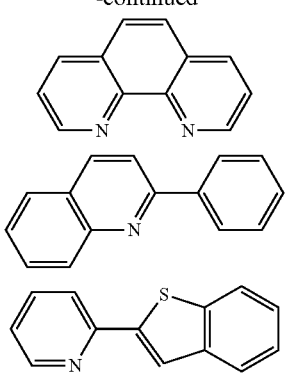

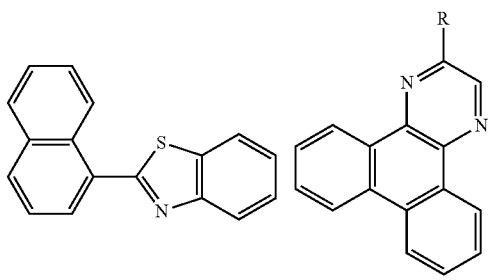

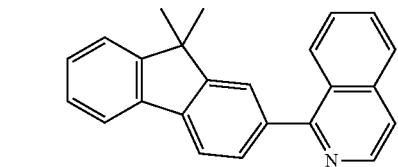

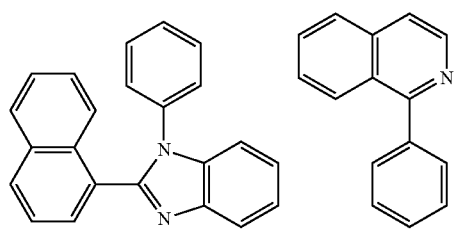

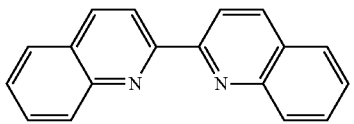

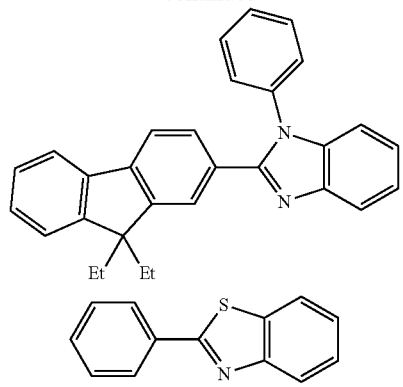
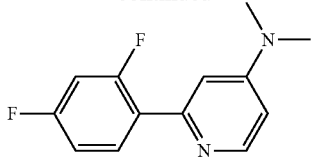

The transition metal compound represented by the above Chemical Formulas can be synthesized by a metalation process as in the following Reaction Scheme 1. The following reaction shows a general reaction but the present invention is not limited to the reaction.

[Reaction Scheme 1]

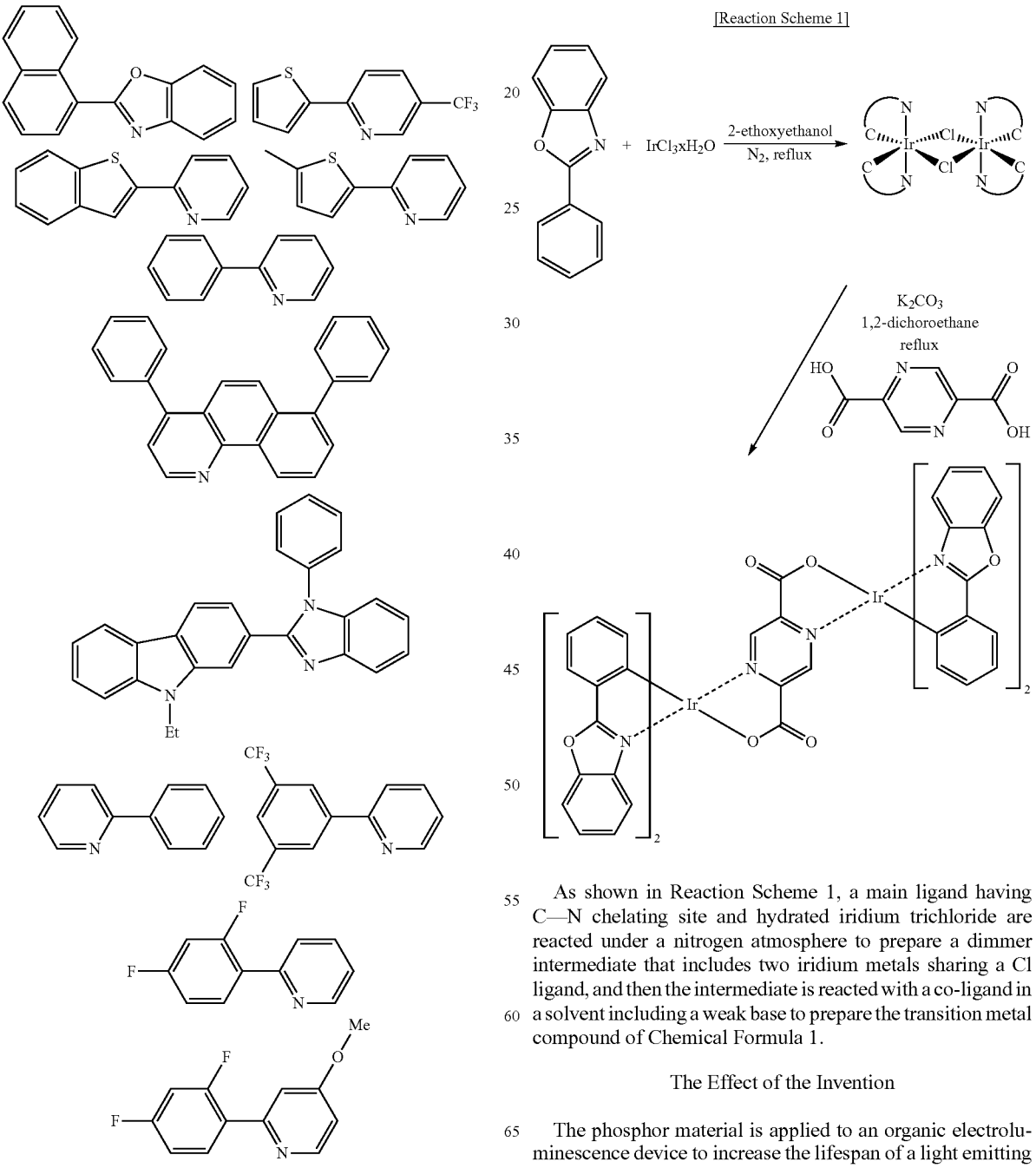

As shown in Reaction Scheme 1, a main ligand having C—N chelating site and hydrated iridium trichloride are reacted under a nitrogen atmosphere to prepare a dimmer intermediate that includes two iridium metals sharing a Cl ligand, and then the intermediate is reacted with a co-ligand in a solvent including a weak base to prepare the transition metal compound of Chemical Formula 1.

The Effect of the Invention

The phosphor material is applied to an organic electroluminescence device to increase the lifespan of a light emitting material, to increase the luminous efficiency, and to reduce concentration quenching. It also applied to display devices, displays, backlights, electron photographs, illumination sources, light sources, signs, signboards, interiors, and so on. It can also be applied to display devices, displays, backlights, electron photographs, illumination sources, light sources, signs, signboards, interiors, and so on. Compared to a conventional fluorescent organic EL device having external quantum efficiency of less than 5%, power consumption can be significantly reduced. By introducing a substituent having steric hindrance, high efficiency can be maintained even at high doping concentration and thereby lifespan of a device increases. The compound of the present invention can be applied for medicals purposes, and to fluorescent brighteners, photographs, UV absorbents, laser dyes, dyes for a color filter, color conversion filters, and so on.

BEST MODE

The present invention can be specified by the following Examples. The Examples only illustrate the present invention and they do not limit the scope and range of the present invention, which is defined by the accompanying claims.

Example 1

Compound 1: $(PBTZ)_2Ir(Py2CA)Ir(PBTZ)_2$

Synthesis of $(PBTZ)_2Ir(Cl)_2Ir(PBTZ)_2$: 5 mmol of 2-phenyl benzothiazole (PBTZ) and 10 mmol of $IrCl_3 \times H_2O$ were dissolved in 100 mL of 2-ethoxyethanol, and refluxed for 24 hours under a nitrogen atmosphere. The solution was cooled down to room temperature, and 200 mL of 5% hydrochloric acid aqueous solution was added thereto for extraction. The extract was filtrated, rinsed with water and a diethyl ether solvent, and dried to thereby produce $(PBTZ)_2Ir(Cl)_2Ir(PBTZ)_2$ at a yield of 93%.

Synthesis of $(PBTZ)_2Ir(Py2CA)Ir(PBTZ)_2$: 5 mmol of $(PBTZ)_2Ir(Cl)_2Ir(PBTZ)_2$, 25 mmol of pyrazine-2,5-dicarboxylic acid (Py2CA), and 50 mmol of potassium carbonate were mixed in 10.0 mL of 1,2-dichloroethane, and refluxed for 24 hours under a nitrogen atmosphere. After the reaction was complete, the solution was cooled down to about 50° C. and filtrated. The filtrate solution was purified by using column chromatography to thereby produce $(PBTZ)_2Ir(Py2CA)Ir(PBTZ)_2$ at a yield of 82%.

Example 2

Compound 2: $(PBTZ)_2Ir(2MPy2CA)Ir(PBTZ)_2$

Synthesis of $(PBTZ)_2Ir(2MPy2CA)Ir(PBTZ)_2$: 5 mmol of $(PBTZ)_2Ir(Cl)_2Ir(PBTZ)_2$, 25 mmol of 3,6-dimethyl pyrazine-2,5-dicarboxylic acid (2MPy2CA), and 50 mmol of potassium carbonate were mixed in 100 mL of 1,2-dichloroethane, and refluxed for 24 hours under a nitrogen atmosphere. After the reaction was complete, the solution was cooled down to about 50° C. and filtrated. The filtrated solution was purified by using column chromatography to thereby produce $(PBTZ)_2Ir(2MPy2CA)Ir(PBTZ)_2$ at a yield of 89%.

Example 3

Compound 3: $(PBTZ)_2Ir(2TFPy2CA)Ir(PBTZ)_2$

Synthesis of $(PBTZ)_2Ir(2TFPy2CA)Ir(PBTZ)_2$: 5 mmol of $(PBTZ)_2Ir(Cl)_2Ir(PBTZ)_2$, 25 mmol of 3,6-bistrifluoromethylpyrazine-2,5-dicarboxylic acid (2TFPy2CA), and 50 mmol of potassium carbonate were mixed in 100 mL of 1,2-dichloroethane, and refluxed for 24 hours under a nitrogen atmosphere. After the reaction was complete, the solution was cooled down to about 50° C., and filtrated. The filtrated solution was purified by using column chromatography to thereby produce $(PBTZ)_2Ir(2TFPy2CA)Ir(PBTZ)_2$ at a yield of 81%.

Example 4

Compound 4: $(2FPpy)_2Ir(Py2CA)Ir(2FPpy)_2$

Synthesis of $(2FPpy)_2Ir(Cl)_2Ir(2FPpy)_2$: 5 mmol of 2,4-difluorophenyl-2-pyridine (2FPpy) and 10 mmol of $IrCl_3 \times H_2O$ were dissolved in 100 mL of 2-ethoxyethanol, and refluxed for 24 hours under a nitrogen atmosphere. The solution was cooled down to room temperature, and 200 mL of 5% hydrochloric acid aqueous solution was added thereto for extraction. The extract was filtrated, rinsed with water and a diethyl ether solvent, and dried to thereby produce $(2FPpy)_2Ir(Cl)_2Ir(2FPpy)_2$ at a yield of 94%.

Synthesis of $(2FPpy)_2Ir(Py2CA)Ir(2FPpy)_2$: 5 mmol of $(2FPpy)_2Ir(Cl)_2Ir(2FPpy)_2$, 25 mmol of pyrazine-2,5-dicarboxylic acid (Py2CA), and 50 mmol of potassium carbonate were mixed in 100 mL of 1,2-dichloroethane, and refluxed for 24 hours under a nitrogen atmosphere. After the reaction was complete, the solution was cooled down to about 50° C., and filtrated. The filtrated solution was purified by using column chromatography to thereby produce $(2FPpy)_2Ir(Py2CA)Ir(2FPpy)_2$ at a yield of 86%.

Example 5

Compound 5: $(2FPpy)_2Ir(2MPy2CA)Ir(2FPpy)_2$

Synthesis of $(2FPpy)_2Ir(2MPy2CA)Ir(2FPpy)_2$ 5 mmol of $(2FPpy)_2Ir(Cl)_2Ir(2FPpy)_2$, 25 mmol of 3,6-dimethyl pyrazine-2,5-dicarboxylic acid (2MPy2CA), and 50 mmol of potassium carbonate were mixed in 100 mL of 1,2-dichloroethane, and refluxed for 24 hours under a nitrogen atmosphere. After the reaction was complete, the solution was cooled down to about 50° C., and filtrated. The filtrated solution was purified by using column chromatography to thereby produce $(2FPpy)_2Ir(2MPy2CA)Ir(2FPpy)_2$ at a yield of 87%.

Example 6

Compound 6: $(2FPpy)_2Ir(2TFPy2CA)Ir(2FPpy)_2$

Synthesis of $(2FPpy)_2Ir(2TFPy2CA)Ir(2FPpy)_2$: 5 mmol of $(2FPpy)_2Ir(Cl)_2Ir(2FPpy)_2$, 25 mmol of 3,6-bistrifluoromethylpyrazine-2,5-dicarboxylic acid (2TFPy2CA), and 50 mmol of potassium carbonate were mixed in 100 mL of 1,2-dichloroethane, and refluxed for 24 hours under a nitrogen atmosphere. After the reaction was complete, the solution was cooled down to about 50° C., and filtrated. The filtrated solution was purified by using column chromatography to thereby produce $(2FPpy)_2Ir(2TFPy2CA)Ir(2FPpy)_2$ at a yield of 82%.

Example 7

Compound 7: $(SPBOZ)_2Ir(Py2CA)Ir(SPBOZ)_2$

Synthesis of $(SPBOZ)_2Ir(Cl)_2Ir(SPBOZ)_2$: 5 mmol of 4-(4-trimethylsilylphenyl)benzoxazole (SPBOZ) and 10 mmol of IrCl₃×H₂O were dissolved in 100 mL of 2-ethoxyethanol, and refluxed for 24 hours under a nitrogen atmosphere. The solution was cooled down to room temperature, and 200 mL of 5% hydrochloric acid aqueous solution was added thereto for extraction. The extract was filtered, rinsed with water and a diethyl ether solvent, and dried to thereby produce (SPBOZ)₂Ir(Cl)₂Ir(SPBOZ)₂ at a yield of 95%.

Synthesis of (SPBOZ)₂Ir(Py2CA)Ir(SPBOZ)₂: 5 mmol of (SPBOZ)₂Ir(Cl)₂Ir(SPBOZ)₂, 25 mmol of pyrazine-2,5-dicarboxylic acid (Py2CA), and 50 mmol of potassium carbonate were mixed in 100 mL of 1,2-dichloroethane, and refluxed for 24 hours under a nitrogen atmosphere. After the reaction was complete, the solution was cooled down to about 50° C., and filtrated. The filtrated solution was purified by using column chromatography to thereby produce (SPBOZ)₂Ir(Py2CA)Ir(SPBOZ)₂ at a yield of 90%.

Example 8

Compound 8: (SPBOZ)₂Ir (2MPy2CA)Ir(SPBOZ)₂

Synthesis of (SPBOZ)₂Ir (2MPy2CA)Ir(SPBOZ)₂: 5 mmol of (SPBOZ)₂Ir(Cl)₂Ir(SPBOZ)₂, 25 mmol of 3,6-dimethylpyrazine-2,5-dicarboxylic acid (2MPy2CA), and 50 mmol of potassium carbonate were mixed in 100 mL of 1,2-dichloroethane, and refluxed for 24 hours under a nitrogen atmosphere. After the reaction was complete, the solution was cooled down to about 50° C., and filtrated. The filtrate solution was purified by using column chromatography to thereby produce (SPBOZ)₂Ir (2MPy2CA)Ir(SPBOZ)₂ at a yield of 88%.

Example 9

Compound 9: (SPBOZ)₂Ir (2TFPy2CA)Ir(SPBOZ)₂

Synthesis of (SPBOZ)₂Ir (2TFPy2CA)Ir(SPBOZ)₂: 5 mmol of (SPBOZ)₂Ir(Cl)₂Ir(SPBOZ)₂, 25 mmol of 3,6-bistrifluoromethylpyrazine-2,5-dicarboxylic acid (2TFPy2CA), and 50 mmol of potassium carbonate were mixed in 100 mL of 1,2-dichloroethane, and refluxed for 24 hours under a nitrogen atmosphere. After the reaction was complete, the solution was cooled down to about 50° C., and filtrated. The filtrated solution was purified by using column chromatography to thereby produce (2FPpy)₂Ir (2TFPy2CA)Ir (2FPpy)₂ at a yield of 80%

Example 10

Compound 10: (DMFQ)₂Ir(Py2CA)Ir(DMFQ)₂

Synthesis of (DMFQ)₂Ir(Cl)₂Ir(DMFQ)₂: 5 mmol of 1-(9,9-dimethyl-fluore-7-nyl)isoquinoline (DMFQ) and 10 mmol of IrCl₃×H₂O were dissolved in 100 mL of 2-ethoxyethanol, and refluxed for 24 hours under a nitrogen atmosphere. The solution was cooled down to room temperature, and 200 mL of 5% hydrochloric acid aqueous solution was added thereto for extraction. The extract was filtrated, rinsed with water and a diethyl ether solvent, and dried to thereby produce (DMFQ)₂Ir(Cl)₂Ir(DMFQ)₂ at a yield of 95%.

Synthesis of (DMFQ)₂Ir(Py2CA)Ir(DMFQ)₂: 5 mmol of (DMFQ)₂Ir(Cl)₂Ir(DMFQ)₂, 25 mmol of pyrazine-2,5-dicarboxylic acid (Py2CA), and 50 mmol of potassium carbonate were mixed in 100 mL of 1,2-dichloroethane, and refluxed for 24 hours under a nitrogen atmosphere. After the reaction was complete, the solution was cooled down to about 50° C., and filtrated. The filtrated solution was purified by using column chromatography to thereby produce (DMFQ)₂Ir(Py2CA)Ir(DMFQ)₂ at a yield of 82%.

Example 11

Compound 11: (DMFQ)₂Ir (2MPy2CA)Ir(DMFQ)₂

Synthesis of (DMFQ)₂Ir (2MPy2CA)Ir(DMFQ)₂: 5 mmol of (DMFQ)₂Ir(Cl)₂Ir(DMFQ)₂, 25 mmol of 3,6-dimethyl pyrazine-2,5-dicarboxylic acid (2MPy2CA) and 50 mmol of potassium carbonate were mixed in 100 mL of 1,2-dichloroethane, and refluxed for 24 hours under a nitrogen atmosphere. After the reaction was complete, the solution was cooled down to about 50° C. and filtrated. The filtrated solution was purified by using column chromatography to thereby produce (DMFQ)₂Ir (2MPy2CA)Ir(DMFQ)₂ at a yield of 83%.

Example 12

Compound 12: (DMFQ)₂Ir (2TFPy2CA)Ir(DMFQ)₂

Synthesis of (DMFQ)₂Ir (2TFPy2CA)Ir(DMFQ)₂: 5 mmol of (DMFQ)₂Ir(Cl)₂Ir(DMFQ)₂, 25 mmol of 3,6-bistrifluoromethylpyrazine-2,5-dicarboxylic acid (2TFPy2CA), and 50 mmol of potassium carbonate were mixed in 100 mL of 1,2-dichloroethane, and refluxed for 24 hours under a nitrogen atmosphere. After the reaction was complete, the solution was cooled down to about 50° C. and filtrated. The filtrated solution was purified by using column chromatography to thereby produce (DMFQ)₂Ir (2TFPy2CA)Ir(DMFQ)₂ at a yield of 78%

Example 13

Compound 13: (PBTZ)₂Ir(Np2CA)Ir(PBTZ)₂

Synthesis of (PBTZ)₂Ir(Cl)₂Ir(PBTZ)₂: 5 mmol of 2-phenyl benzothiazole (PBTZ) and 10 mmol of IrCl₃×H₂O were dissolved in 100 mL of 2-ethoxyethanol, and refluxed for 24 hours under a nitrogen atmosphere. The solution was cooled down to room temperature, and 200 mL of 5% hydrochloric acid aqueous solution was added thereto for extraction. The extract was filtrated, rinsed with water and a diethyl ether solvent, and dried to thereby produce (PBTZ)₂Ir(Cl)₂Ir(PBTZ)₂ at a yield of 93%.

Synthesis of (PBTZ)₂Ir(Np2CA)Ir(PBTZ)₂: 5 mmol of (PBTZ)₂Ir(Cl)₂Ir(PBTZ)₂, 25 mmol of 1,5-naphthylidine-2,6-dicarboxylic acid (Np2CA), and 50 mmol of potassium carbonate were mixed in 100 mL of 1,2-dichloroethane, and refluxed for 24 hours under a nitrogen atmosphere. After the reaction was complete, the solution was cooled down to about 50° C. and filtrated. The filtrated solution was purified by using column chromatography to thereby produce (PBTZ)₂Ir (Np2CA)Ir(PBTZ)₂ at a yield of 88%.

Example 14

Compound: 14 (PBTZ)₂Ir (2MNp2CA)Ir(PBTZ)₂

Synthesis of (PBTZ)₂Ir (2MNp2CA)Ir(PBTZ)₂: 5 mmol of (PBTZ)₂Ir(Cl)₂Ir(PBTZ)₂, 25 mmol of 3,7-dimethyl-1,5-naphthylidine-2,6-dicarboxylic acid (2MNp2CA), and 50 mmol of potassium carbonate were mixed in 100 mL of 1,2-dichloroethane, and refluxed for 24 hours under a nitrogen atmosphere. After the reaction was complete, the solution was cooled down to about 50° C. and filtrated. The filtrated solution was purified by using column chromatography to thereby produce (PBTZ)$_2$Ir (2MNp2CA)Ir(PBTZ)$_2$ at a yield of 90%.

Example 15

Compound 15: (PBTZ)$_2$Ir (2TFNp2CA)Ir(PBTZ)$_2$

Synthesis of (PBTZ)$_2$Ir (2TFNp2CA)Ir(PBTZ)$_2$: 5 mmol of (PBTZ)$_2$Ir(Cl)$_2$Ir(PBTZ)$_2$, 25 mmol of 3,7-bistrifluoromethyl-1,5-naphthylidine-2,6-dicarboxylic acid (2TFNp2CA), and 50 mmol of potassium carbonate were mixed in 100 mL of 1,2-dichloroethane, and refluxed for 24 hours under a nitrogen atmosphere. After the reaction was complete, the solution was cooled down to about 50° C. and filtrated. The filtrated solution was purified by using column chromatography to thereby produce (PBTZ)$_2$Ir (2TFNp2CA)Ir(PBTZ)$_2$ at a yield of 85%.

Example 16

Compound 16: (2FPpy)$_2$Ir(Np2CA)Ir (2FPpy)$_2$

Synthesis of (2FPpy)$_2$Ir(Cl)$_2$Ir (2FPpy)$_2$: 5 mmol of 2,4-difluorophenyl-2-pyridine (2FPpy) and 10 mmol of IrCl$_3$×H$_2$O were dissolved in 100 mL of 2-ethoxyethanol, and refluxed for 24 hours under a nitrogen atmosphere. The solution was cooled down to room temperature, and 200 mL of 5% hydrochloric acid aqueous solution was added thereto for extraction. The extract was filtrated, rinsed with water and a diethyl ether solvent, and dried to thereby produce (2FPpy)$_2$Ir(Cl)$_2$Ir (2FPpy)$_2$ at a yield of 94%.

Synthesis of (2FPpy)$_2$Ir(Np2CA)Ir (2FPpy)$_2$: 5 mmol of (2FPpy)$_2$Ir(Cl)$_2$Ir (2FPpy)$_2$, 25 mmol of 1,5-naphthylidine-2,6-dicarboxylic acid (Np2CA), and 50 mmol of potassium carbonate were mixed in 100 mL of 1,2-dichloroethane, and refluxed for 24 hours under a nitrogen atmosphere. After the reaction was complete, the solution was cooled down to about 50° C. and filtrated. The filtrated solution was purified by using column chromatography to thereby produce (2FPpy)$_2$Ir(Np2CA)Ir (2FPpy)$_2$ at a yield of 91%.

Example 17

Compound 17: (2FPpy)$_2$Ir (2MNp2CA)Ir (2FPpy)$_2$

Synthesis of (2FPpy)$_2$Ir (2MNp2CA)Ir (2FPpy)$_2$ 5 mmol of (2FPpy)$_2$Ir(Cl)$_2$Ir (2FPpy)$_2$, 25 mmol of 3,7-dimethyl-1,5-naphthylidine-2,6-dicarboxylic acid (2MNp2CA), and 50 mmol of potassium carbonate were mixed in 100 mL of 1,2-dichloroethane, and refluxed for 24 hours under a nitrogen atmosphere. After the reaction was complete, the solution was cooled down to about 50° C. and filtrated. The filtrated solution was purified by using column chromatography to thereby produce (2FPpy)$_2$Ir (2MNp2CA)Ir (2FPpy)$_2$ at a yield of 93%.

Example 18

Compound 18: (2FPpy)$_2$Ir (2TFNp2CA)Ir (2FPpy)$_2$

Synthesis of (2FPpy)$_2$Ir (2TFNp2CA)Ir (2FPpy)$_2$: 5 mmol of (2FPpy)$_2$Ir(Cl)$_2$Ir (2FPpy)$_2$, 25 mmol of 3,7-bistrifluoromethyl-1,5-naphthylidine-2,6-dicarboxylic acid (2TFNp2CA), and 50 mmol of potassium carbonate were mixed in 100 mL of 1,2-dichloroethane, and refluxed for 24 hours under a nitrogen atmosphere. After the reaction was complete, the solution was cooled down to about 50° C. and filtrated. The filtrated solution was purified by using column chromatography to thereby produce (2FPpy)$_2$Ir (2TFNp2CA)Ir (2FPpy)$_2$ at a yield of 84%.

Example 19

Compound 19: (SPBOZ)$_2$Ir(Np2CA)Ir(SPBOZ)$_2$

Synthesis of (SPBOZ)$_2$Ir(Cl)$_2$Ir(SPBOZ)$_2$: 5 mmol of 4-(4-trimethylsilylphenyl)benzoxazole (SPBOZ) and 10 mmol of IrCl$_3$×H$_2$O were dissolved in 100 mL of 2-ethoxyethanol, and refluxed for 24 hours under a nitrogen atmosphere. The solution was cooled down to room temperature, and 200 mL of 5% hydrochloric acid aqueous solution was added thereto for extraction. The extract was filtrated, rinsed with water and a diethyl ether solvent, and dried to thereby produce (SPBOZ)$_2$Ir(Cl)$_2$Ir(SPBOZ)$_2$ at a yield of 95%.

Synthesis of (SPBOZ)$_2$Ir(Np2CA)Ir(SPBOZ)$_2$: 5 mmol of (SPBOZ)$_2$Ir(Cl)$_2$Ir(SPBOZ)$_2$, 25 mmol of 1,5-naphthylidine-2,6-dicarboxylic acid (Np2CA), and 50 mmol of potassium carbonate were mixed in 100 mL of 1,2-dichloroethane, and refluxed for 24 hours under a nitrogen atmosphere. After the reaction was complete, the solution was cooled down to about 50° C. and filtrated. The filtrated solution was purified by using column chromatography to thereby produce (SPBOZ)$_2$Ir(Np2CA)Ir(SPBOZ)$_2$ at a yield of 93%.

Example 20

Compound 20: (SPBOZ)$_2$Ir (2MNp2CA)Ir(SPBOZ)$_2$

Synthesis of (SPBOZ)$_2$Ir (2MNp2CA)Ir(SPBOZ)$_2$: 5 mmol of (SPBOZ)$_2$Ir(Cl)$_2$Ir(SPBOZ)$_2$, 25 mmol of 3,7-dimethyl-1,5-naphthylidine-2,6-dicarboxylic acid (2MNp2CA), and 50 mmol of potassium carbonate were mixed in 100 mL of 1,2-dichloroethane, and refluxed for 24 hours under a nitrogen atmosphere. After the reaction was complete, the solution was cooled down to about 50° C. and filtrated. The filtrated solution was purified by using column chromatography to thereby produce (SPBOZ)$_2$Ir (2MNp2CA)Ir(SPBOZ)$_2$ at a yield of 88%.

Example 21

Compound 21: (SPBOZ)$_2$Ir (2TFNp2CA)Ir(SPBOZ)$_2$

Synthesis of (SPBOZ)$_2$Ir (2TFNp2CA)Ir(SPBOZ)$_2$: 5 mmol of (SPBOZ)$_2$Ir(Cl)$_2$Ir(SPBOZ)$_2$, 25 mmol of 3,7-bistrifluoromethyl-1,5-naphthylidine-2,6-dicarboxylic acid (2TFNp2CA), and 50 mmol of potassium carbonate were mixed in 100 mL of 1,2-dichloroethane, and refluxed for 24 hours under a nitrogen atmosphere. After the reaction was complete, the solution was cooled down to about 50° C. and filtrated. The filtrated solution was purified by using column chromatography to thereby produce (SPBOZ)$_2$Ir (2TFNp2CA)Ir(SPBOZ)$_2$ at a yield of 85%.

Example 22

Compound 22 (DMFQ)$_2$Ir(Np2CA)Ir(DMFQ)$_2$

Synthesis of (DMFQ)$_2$Ir(Cl)$_2$Ir(DMFQ)$_2$: 5 mmol of 1-(9,9-dimethyl-fluore-7-nyl)isoquinoline (DMFQ) and 10 mmol of IrCl$_3$×H$_2$O were dissolved in 100 mL of 2-ethoxyethanol, and refluxed for 24 hours under a nitrogen atmosphere. The solution was cooled down into room temperature, and 200 mL of 5% hydrochloric acid aqueous solution was added thereto the for extraction. The extract was filtrated, rinsed with water and a diethyl ether solvent, and dried to thereby produce (DMFQ)$_2$Ir(Cl)$_2$Ir(DMFQ)$_2$ at a yield of 93%.

Synthesis of (DMFQ)$_2$Ir(Np2CA)Ir(DMFQ)$_2$: 5 mmol of (DMFQ)$_2$Ir(Cl)$_2$Ir(DMFQ)$_2$ and 25 mmol of 1,5-naphthylidine-2,6-dicarboxylic acid (Np2CA), and 50 mmol of potassium carbonate were mixed in 100 mL of 1,2-dichloroethane, and refluxed for 24 hours under a nitrogen atmosphere. After the reaction was complete, the solution was cooled down to about 50° C. and filtrated. The filtrated solution was purified by using column chromatography to thereby produce (DMFQ)$_2$Ir(Np2CA)Ir(DMFQ)$_2$ at a yield of 91%.

Example 23

Compound 23: (DMFQ)$_2$Ir (2MNp2CA)Ir(DMFQ)$_2$

Synthesis of (DMFQ)$_2$Ir (2MNp2CA)Ir(DMFQ)$_2$: 5 mmol of (DMFQ)$_2$Ir(Cl)$_2$Ir(DMFQ)$_2$, 25 mmol of 3,7-dimethyl-1,5-naphthylidine-2,6-dicarboxylic acid (Np2CA), and 50 mmol of potassium carbonate were mixed in 100 mL of 1,2-dichloroethane, and refluxed for 24 hours under a nitrogen atmosphere. After the reaction was complete, the solution was cooled down to about 50° C. and filtrated. The filtrated solution was purified by using column chromatography to thereby produce (DMFQ)$_2$Ir (2MNp2CA)Ir(DMFQ)$_2$ at a yield of 94%.

Example 24

Compound 24: (DMFQ)$_2$Ir (2TFPy2CA)Ir(DMFQ)$_2$

Synthesis of (DMFQ)$_2$Ir (2TFPy2CA)Ir(DMFQ)$_2$: 5 mmol of (DMFQ)$_2$Ir(Cl)$_2$Ir(DMFQ)$_2$, 25 mmol of 3,7-bistrifluoromethyl-1,5-naphthylidine-2,6-dicarboxylic acid (2TFNp2CA), and 50 mmol of potassium carbonate were mixed in 100 mL of 1,2-dichloroethane, and refluxed for 24 hours under a nitrogen atmosphere. After the reaction was complete, the solution was cooled down to about 50° C. and filtrated. The filtrated solution was purified by using column chromatography to thereby produce (DMFQ)$_2$Ir (2TFNp2CA)Ir(DMFQ)$_2$ at a yield of 90%.

Example 25

Compound 25: (PBTZ)$_2$Ir (2TZ2CA)Ir(PBTZ)$_2$

Synthesis of (PBTZ)$_2$Ir(Cl)$_2$Ir(PBTZ)$_2$: 5 mmol of 2-phenyl benzothiazole (PBTZ) and 10 mmol of IrCl$_3$×H$_2$O were dissolved in 100 mL of 2-ethoxyethanol, and refluxed for 24 hours under a nitrogen atmosphere. The solution was cooled down to room temperature, and 200 mL of 5% hydrochloric acid aqueous solution was added thereto for extraction. The extract was filtrated, rinsed with water and a diethyl ether solvent, and dried to thereby produce (PBTZ)$_2$Ir(Cl)$_2$Ir (PBTZ)$_2$ at a yield of 93%.

Synthesis of (PBTZ)$_2$Ir (2TZ2CA)Ir(PBTZ)$_2$: 5 mmol of (PBTZ)$_2$Ir(Cl)$_2$Ir(PBTZ)$_2$, 25 mmol of thiazolo(5,4-d)thiazole-2,5-dicarboxylic acid (2TZ2CA), and 50 mmol of potassium carbonate were mixed in 100 mL of 1,2-dichloroethane, and refluxed for 24 hours under a nitrogen atmosphere. After the reaction was complete, the solution was cooled down to about 50° C. and filtrated. The filtrated solution was purified by using column chromatography to thereby produce (PBTZ)$_2$Ir (2TZ2CA)Ir(PBTZ)$_2$ at a yield of 91%.

Example 26

Compound 26: (2FPpy)$_2$Ir (2TZ2CA)Ir (2FPpy)$_2$

Synthesis of (2FPpy)$_2$Ir(Cl)$_2$Ir (2Fppy)$_2$: 5 mmol of 2,4-difluorophenyl-2-pyridine (2FPpy) and 10 mmol of IrCl$_3$×H$_2$O were dissolved in 100 mL of 2-ethoxyethanol, and refluxed for 24 hours under a nitrogen atmosphere. The solution was cooled down to room temperature, and 200 mL of 5% hydrochloric acid aqueous solution was added thereto for extraction. The extract was filtrated, rinsed with water and a diethyl ether solvent, and dried to thereby produce (2FPpy)$_2$Ir(Cl)$_2$Ir (2FPpy)$_2$ at a yield of 90%.

Synthesis of (2FPpy)$_2$Ir (2TZ2CA)Ir (2FPpy)$_2$: 5 mmol of (2FPpy)$_2$Ir(Cl)$_2$Ir (2FPpy)$_2$, 25 mmol of thiazolo(5,4-d)thiazole-2,5-dicarboxylic acid (2TZ2CA), and 50 mmol of potassium carbonate were mixed in 100 mL of 1,2-dichloroethane, and refluxed for 24 hours under a nitrogen atmosphere. After the reaction was complete, the solution was cooled down to about 50° C. and filtrated. The filtrated solution was purified by using column chromatography to thereby produce (2FPpy)$_2$Ir (2TZ2CA)Ir (2FPpy)$_2$ at a yield of 84%.

Example 27

Compound 27: (SPBOZ)$_2$Ir (2TZ2CA)Ir(SPBOZ)$_2$

Synthesis of (SPBOZ)$_2$Ir(Cl)$_2$Ir(SPBOZ)$_2$: 5 mmol of 4-(4-trimethylsilylphenyl)benzoxazole (SPBOZ) and 10 mmol of IrCl$_3$×H$_2$O were dissolved in 100 mL of 2-ethoxyethanol, and refluxed for 24 hours under a nitrogen atmosphere. The solution was cooled down to room temperature, and 200 mL of 5% hydrochloric acid aqueous solution was added thereto for extraction. The extract was filtrated, rinsed with water and a diethyl ether solvent, and dried to thereby produce (SPBOZ)$_2$Ir(Cl)$_2$Ir(SPBOZ)$_2$ at a yield of 91%.

Synthesis of (SPBOZ)$_2$Ir(Np2CA)Ir(SPBOZ)$_2$: 5 mmol of (SPBOZ)$_2$Ir(Cl)$_2$Ir(SPBOZ)$_2$ and 25 mmol of thiazolo(5,4-d)thiazole-2,5-dicarboxylic acid (2TZ2CA), and 50 mmol of potassium carbonate were mixed in 100 mL of 1,2-dichloroethane, and refluxed for 24 hours under a nitrogen atmosphere. After the reaction was complete, the solution was cooled down to about 50° C. and filtrated. The filtrated solution was purified by using column chromatography to thereby produce (SPBOZ)$_2$Ir (2TZ2CA)Ir(SPBOZ)$_2$ at a yield of 92%.

Example 28

Compound 28: (DMFQ)$_2$Ir (2TZ2CA)Ir(DMFQ)$_2$

Synthesis of (DMFQ)$_2$Ir(Cl)$_2$Ir(DMFQ)$_2$: 5 mmol of 1-(9,9-dimethyl-fluore-7-nyl)isoquinoline (DMFQ) and 10 mmol of IrCl$_3$×H$_2$O were dissolved in 100 mL of 2-ethoxyethanol, and refluxed for 24 hours under a nitrogen atmosphere. The solution was cooled down to room temperature, and 200 mL of 5% hydrochloric acid aqueous solution was added thereto for extraction. The extract was filtrated, rinsed with water and a diethyl ether solvent, and dried to thereby produce (DMFQ)$_2$Ir(Cl)$_2$Ir(DMFQ)$_2$ at a yield of 93%.

Synthesis of (DMFQ)$_2$Ir (2TZ2CA)Ir(DMFQ)$_2$: 5 mmol of (DMFQ)$_2$Ir(Cl)$_2$Ir(DMFQ)$_2$, 25 mmol of thiazolo(5,4-d)thiazole-2,5-dicarboxylic acid (2TZ2CA), and 50 mmol of potassium carbonate were mixed in 100 mL of 1,2-dichloroethane, and refluxed for 24 hours under a nitrogen atmosphere. After the reaction was complete, the solution was cooled down to about 50° C. and filtrated. The filtrated solution was purified by using column chromatography to thereby produce (DMFQ)$_2$Ir (2TZ2CA)Ir(DMFQ)$_2$ at a yield of 89%.

Example 29

Compound 29: (PBTZ)$_2$Ir (2OZ2CA)Ir(PBTZ)$_2$

Synthesis of (PBTZ)$_2$Ir(Cl)$_2$Ir(PBTZ)$_2$: 5 mmol of 2-phenyl benzothiazole (PBTZ) and 10 mmol of IrCl$_3$×H$_2$O were dissolved in 100 mL of 2-ethoxyethanol, and refluxed for 24 hours under a nitrogen atmosphere. The solution was cooled down to room temperature, and 200 mL of 5% hydrochloric acid aqueous solution was added thereto for extraction. The extract was filtrated, rinsed with water and a diethyl ether solvent, and dried to thereby produce (PBTZ)$_2$Ir(Cl)$_2$Ir (PBTZ)$_2$ at a yield of 93%.

Synthesis of (PBTZ)$_2$Ir (2OZ2CA)Ir(PBTZ)$_2$: 5 mmol of (PBTZ)$_2$Ir(Cl)$_2$Ir(PBTZ)$_2$, 25 mmol of oxazolo(5,4-d)oxazole-2,5-dicarboxylic acid (2OZ2CA), and 50 mmol of potassium carbonate were mixed in 100 mL of 1,2-dichloroethane, and refluxed for 24 hours under a nitrogen atmosphere. After the reaction was complete, the solution was cooled down to about 50° C. and filtrated. The filtrated solution was purified by using column chromatography to thereby produce (PBTZ)$_2$Ir (2OZ2CA)Ir(PBTZ)$_2$ at a yield of 85%.

Example 30

Compound 30: (2FPpy)$_2$Ir (2OZ2CA)Ir (2FPpy)$_2$

Synthesis of (2FPpy)$_2$Ir(Cl)$_2$Ir (2Fppy)$_2$: 5 mmol of 2,4-difluorophenyl-2-pyridine (2FPpy) and 10 mmol of IrCl$_3$×H$_2$O were dissolved in 100 mL of 2-ethoxyethanol, and refluxed for 24 hours under a nitrogen atmosphere. The solution was cooled down to room temperature, and 200 mL of 5% hydrochloric acid aqueous solution was added thereto for extraction. The extract was filtrated, rinsed with water and a diethyl ether solvent, and dried to thereby produce (2FPpy)$_2$Ir(Cl)$_2$Ir (2FPpy)$_2$ at a yield of 94%.

Synthesis of (2FPpy)$_2$Ir (2OZ2CA)Ir (2FPpy)$_2$: 5 mmol of (2FPpy)$_2$Ir(Cl)$_2$Ir (2FPpy)$_2$, 25 mmol of oxazolo(5,4-d)oxazole-2,5-dicarboxylic acid (2OZ2CA), and 50 mmol of potassium carbonate were mixed in 100 mL of 1,2-dichloroethane, and refluxed for 24 hours under a nitrogen atmosphere. After the reaction was complete, the solution was cooled down to about 50° C. and filtrated. The filtrated solution was purified by using column chromatography to thereby produce (2FPpy)$_2$Ir (2OZ2CA)Ir (2FPpy)$_2$ at a yield of 86%.

Example 31

Compound 31: (SPBOZ)$_2$Ir (2OZ2CA)Ir(SPBOZ)$_2$

Synthesis of (SPBOZ)$_2$Ir(Cl)$_2$Ir(SPBOZ)$_2$: 5 mmol of 4-(4-trimethylsilylphenyl)benzoxazole (SPBOZ) and 10 mmol of IrCl$_3$×H$_2$O were dissolved in 100 mL of 2-ethoxyethanol, and refluxed for 24 hours under a nitrogen atmosphere. The solution was cooled down to room temperature, and 200 mL of 5% hydrochloric acid aqueous solution was added thereto for extraction. The extract was filtrated, rinsed with water and a diethyl ether solvent, and dried to thereby produce (SPBOZ)$_2$Ir(Cl)$_2$Ir(SPBOZ)$_2$ at a yield of 92%.

Synthesis of (SPBOZ)$_2$Ir (2OZ2CA)Ir(SPBOZ)$_2$: 5 mmol of (SPBOZ)$_2$Ir(Cl)$_2$Ir(SPBOZ)$_2$, 25 mmol of oxazolo(5,4-d) oxazole-2,5-dicarboxylic acid (2OZ2CA), and 50 mmol of potassium carbonate were mixed in 100 mL of 1,2-dichloroethane, and refluxed for 24 hours under a nitrogen atmosphere. After the reaction was complete, the solution was cooled down to about 50° C. and filtrated. The filtrated solution was purified by using column chromatography to thereby produce (SPBOZ)$_2$Ir (2OZ2CA)Ir(SPBOZ)$_2$ at a yield of 91%.

Example 32

Compound 32: (DMFQ)$_2$Ir (2OZ2CA)Ir(DMFQ)$_2$

Synthesis of (DMFQ)$_2$Ir(Cl)$_2$Ir(DMFQ)$_2$: 5 mmol of 1-(9, 9-dimethyl-fluore-7-nyl)isoquinoline (DMFQ) and 10 mmol of IrCl$_3$×H$_2$O were dissolved in 100 mL of 2-ethoxyethanol, and refluxed for 24 hours under a nitrogen atmosphere. The solution was cooled down to room temperature, and 200 mL of 5% hydrochloric acid aqueous solution was added thereto for extraction. The extract was filtrated, rinsed with water and a diethyl ether solvent, and dried to thereby produce (DMFQ)$_2$Ir(Cl)$_2$Ir(DMFQ)$_2$ at a yield of 96%.

Synthesis of (DMFQ)$_2$Ir (2OZ2CA)Ir(DMFQ)$_2$: 5 mmol of (DMFQ)$_2$Ir(Cl)$_2$Ir(DMFQ)$_2$, 25 mmol of oxazolo(5,4-d) oxazole-2,5-dicarboxylic acid (2OZ2CA), and 50 mmol of potassium carbonate were mixed in 100 mL of 1,2-dichloroethane, and refluxed for 24 hours under a nitrogen atmosphere. After the reaction was complete, the solution was cooled down to about 50° C. and filtrated. The filtrated solution was purified by using column chromatography to thereby produce (DMFQ)$_2$Ir (2OZ2CA)Ir(DMFQ)$_2$ at a yield of 92%.

PL spectra of the above chemical compounds were acquired, and the results were presented in the following Table 1.

TABLE 1

| compound | PL (nm) | Yield (%) |
|---|---|---|
| Compound 1 | 559 | 82 |
| Compound 2 | 560 | 89 |
| Compound 3 | 563 | 81 |
| Compound 4 | 535 | 86 |
| Compound 5 | 535 | 87 |
| Compound 6 | 542 | 82 |
| Compound 7 | 560 | 90 |
| Compound 8 | 559 | 88 |
| Compound 9 | 563 | 80 |
| Compound 10 | 613 | 82 |
| Compound 11 | 612 | 83 |
| Compound 12 | 614 | 78 |
| Compound 13 | 555 | 88 |
| Compound 14 | 557 | 90 |
| Compound 15 | 560 | 85 |
| Compound 16 | 530 | 91 |
| Compound 17 | 531 | 93 |
| Compound 18 | 538 | 84 |
| Compound 19 | 554 | 93 |
| Compound 20 | 556 | 88 |
| Compound 21 | 560 | 85 |
| Compound 22 | 610 | 91 |
| Compound 23 | 608 | 94 |
| Compound 24 | 602 | 90 |
| Compound 25 | 552 | 91 |
| Compound 26 | 531 | 84 |
| Compound 27 | 561 | 92 |
| Compound 28 | 609 | 89 |
| Compound 29 | 542 | 85 |
| Compound 30 | 532 | 86 |
| Compound 31 | 543 | 91 |
| Compound 32 | 585 | 92 |

Example 33

As for an anode, a 10 Ω/cm² ITO substrate produced by the Corning Company was used. A hole injection layer was formed in a thickness of 60 nm by depositing IDE406 on top of the substrate in a vacuum condition. Subsequently, a hole transport layer was formed by depositing TPD chemical compound on top of the hole injection layer in a thickness of 30 nm in a vacuum condition. A light emitting layer was formed in a thickness of 20 nm by depositing a transition metal compound on top of the hole transport layer in a vacuum condition.

Subsequently, an HBL layer was formed in a thickness of 5 nm by depositing BCP on top of the light emitting layer in a vacuum condition. An electron transport layer (ETL) was formed in a thickness of 20 nm by depositing Alq3 on top of the light emitting layer in a vacuum condition. An organic electroluminescence device was completed by sequentially depositing LiF 1 nm and Al 300 nm on top of the electron transport layer in a vacuum condition to thereby form a LiF/Al electrode.

Simple modifications and alternations of the present invention can be easily made by the ordinary skilled person in the art within the spirit and scope of the appended claims.

The invention claimed is:
1. An organic electroluminescence device comprising the compound represented by the following Chemical Formula 1:

[Chemical Formula 1]

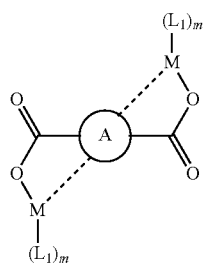

wherein, M is selected from Ir, Pt, Rh, Re, or Os, m is 2, provided that m is 1 when M is Pt,

A of the Chemical Formula 1 is represented by the following Chemical Formulae 2:

[Chemical Formulae 2]

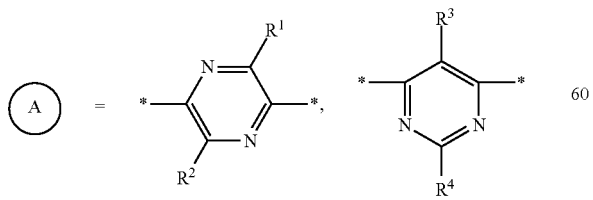

wherein, a portion denoted as * in the above Chemical Formulae 2 has a carboxyl substituent, and transition metal M forms a complex compound by a covalent bond with the carboxyl group and a coordination bond with an adjacent N or P atom, and R1-R4 are the same or different, and are hydrogen, a C1 to C20 alkyl excluding an aromatic cyclic substituent, a cycloalkyl, or a halogen, and L1 is represented by the following formula 3:

[Chemical Formula 3]

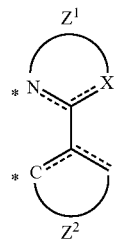

wherein, L1 in the above formula 3 is a independent ligand having a covalent bond site with a carbon denoted as * and a coordination bond with nitrogen and forming a complex compound with the transition metal M of the Formula 1, X is a hetero atom of nitrogen, oxygen, sulfur, or phosphorus, and Z1 and Z2 are atoms for forming a C4 to C7 aromatic hydrocarbon ring or aromatic heterocyclic ring and represented by any one of the following Chemical Formulae 5:

[Chemical Formulae 5]

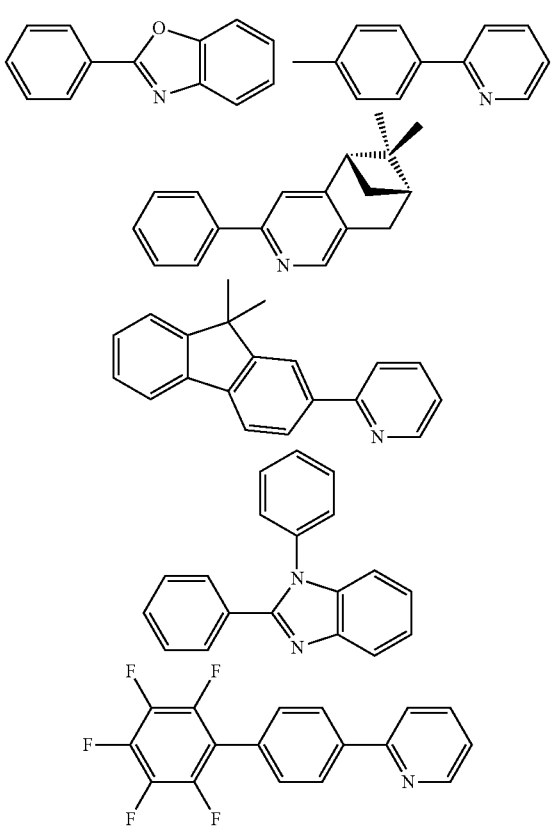

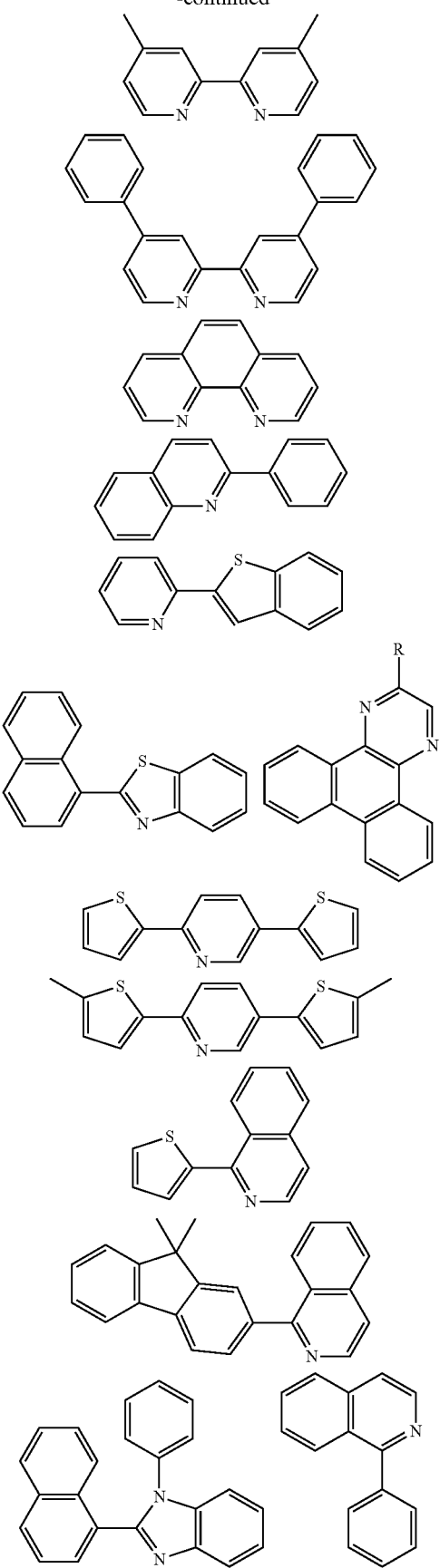
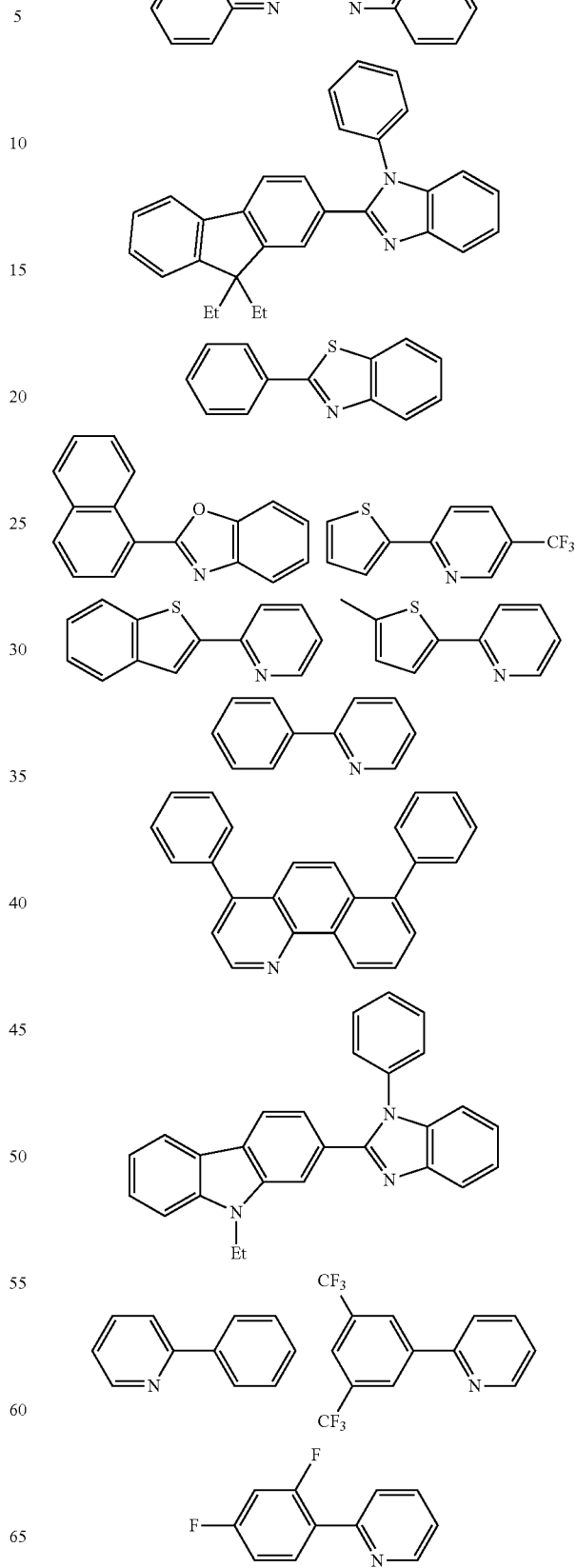

-continued

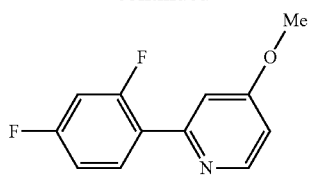

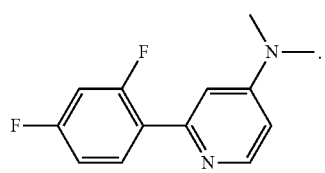

2. An organic electroluminescence device comprising the compound represented by the following Chemical Formula 1:

[Chemical Formula 1]

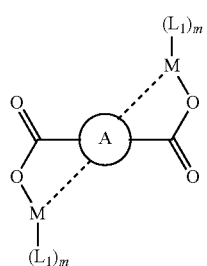

wherein, M is selected from Ir, Pt, Rh, Re, or Os, m is 2, provided that m is 1 when M is Pt,

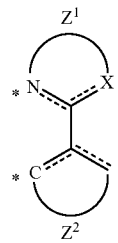

of the Chemical Formula 1 is represented by the following Chemical Formulae 2:

[Chemical Formulae 2]

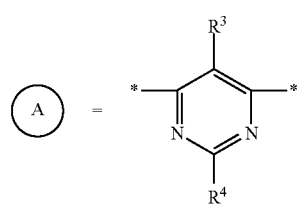

wherein, a portion denoted as * in the above Chemical Formulae 2 has a carboxyl substituent, and transition metal M forms a complex compound by a covalent bond with the carboxyl group and a coordination bond with an adjacent N or P atom, and $R^3$-$R^4$ are the same or different, and are hydrogen, a C1 to C20 alkyl excluding an aromatic cyclic substituent, a cycloalkyl, or a halogen, and $L^1$ is represented by the following formula 3:

[Chemical Formula 3]

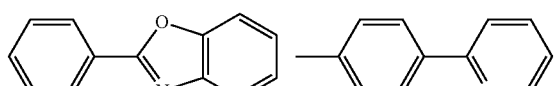

wherein, $L^1$ in the above formula 3 is a independent ligand having a covalent bond site with a carbon denoted as * and a coordination bond with nitrogen and forming a complex compound with the transition metal M of the Formula 1, X is a hetero atom of nitrogen, oxygen, sulfur, or phosphorus, and $Z^1$ and $Z^2$ are atoms for forming a C4 to C7 aromatic hydrocarbon ring or aromatic heterocyclic ring and represented by any one of the following Chemical Formulae 5:

[Chemical Formulae 5]

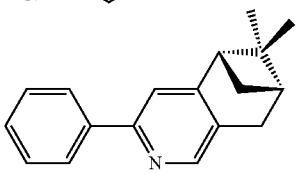

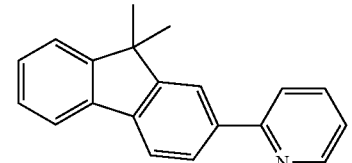

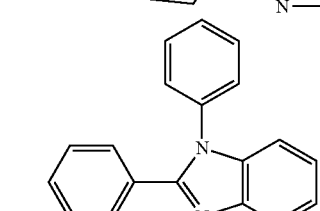

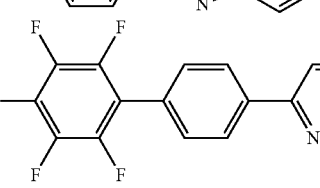

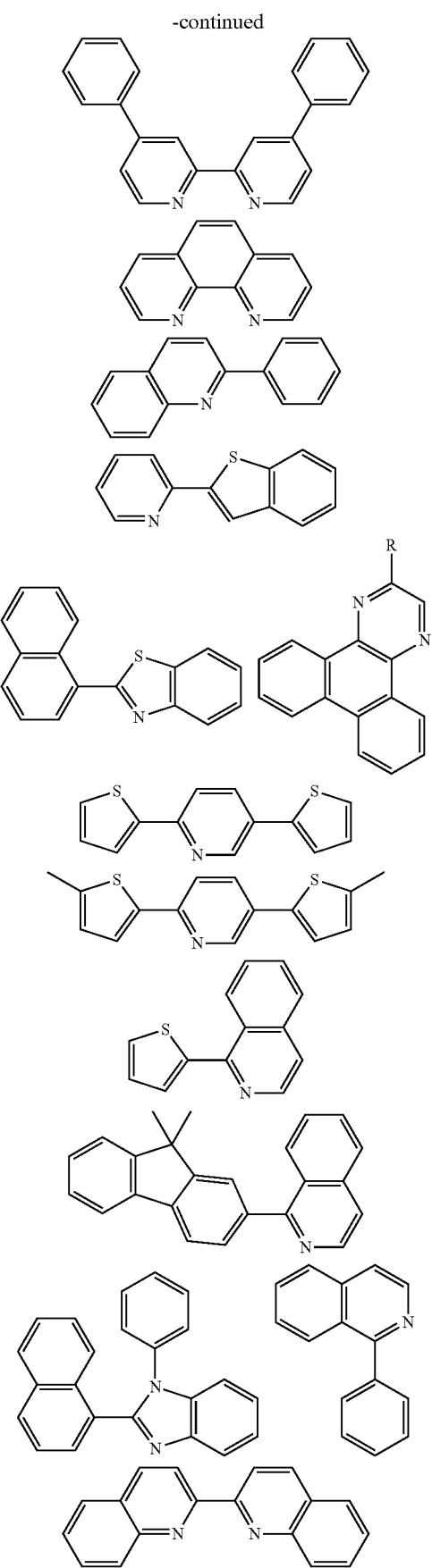
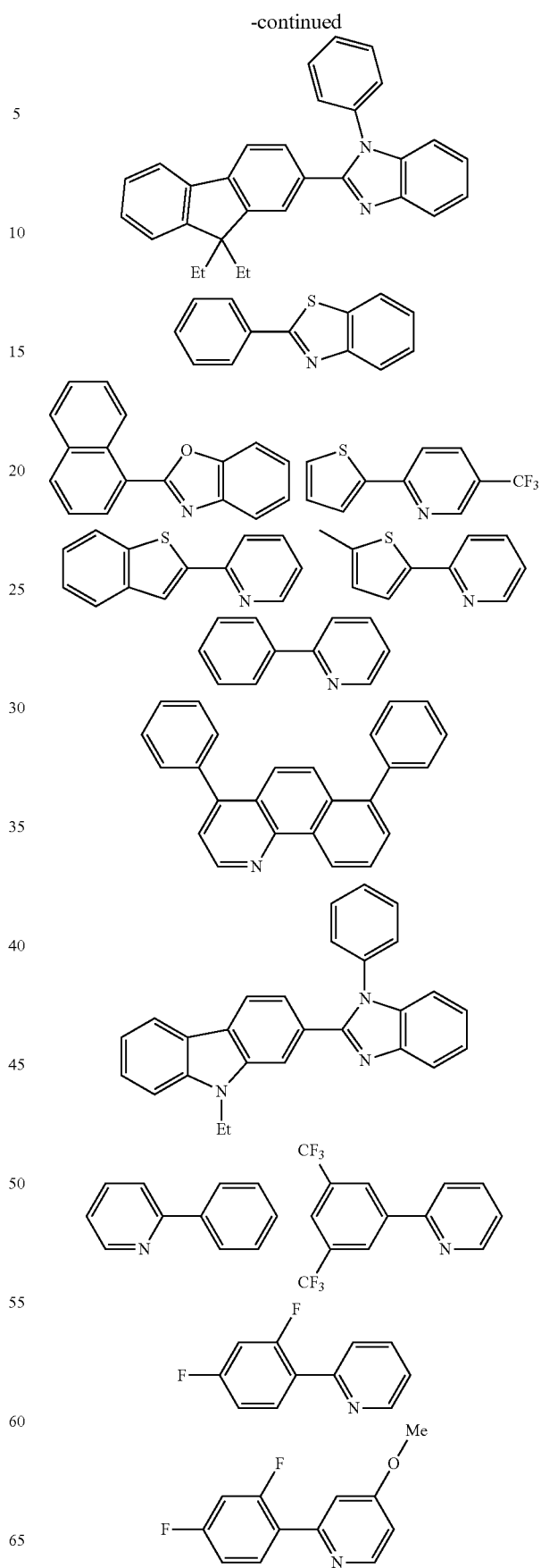

-continued
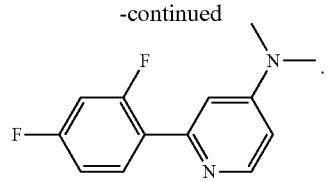
* * * * *